June 27, 1967 L. L. MORSE 3,328,804
HIGH SPEED RECORDER WITH CENTRIFUGAL STYLUS FEED
Filed July 27, 1965 3 Sheets-Sheet 1
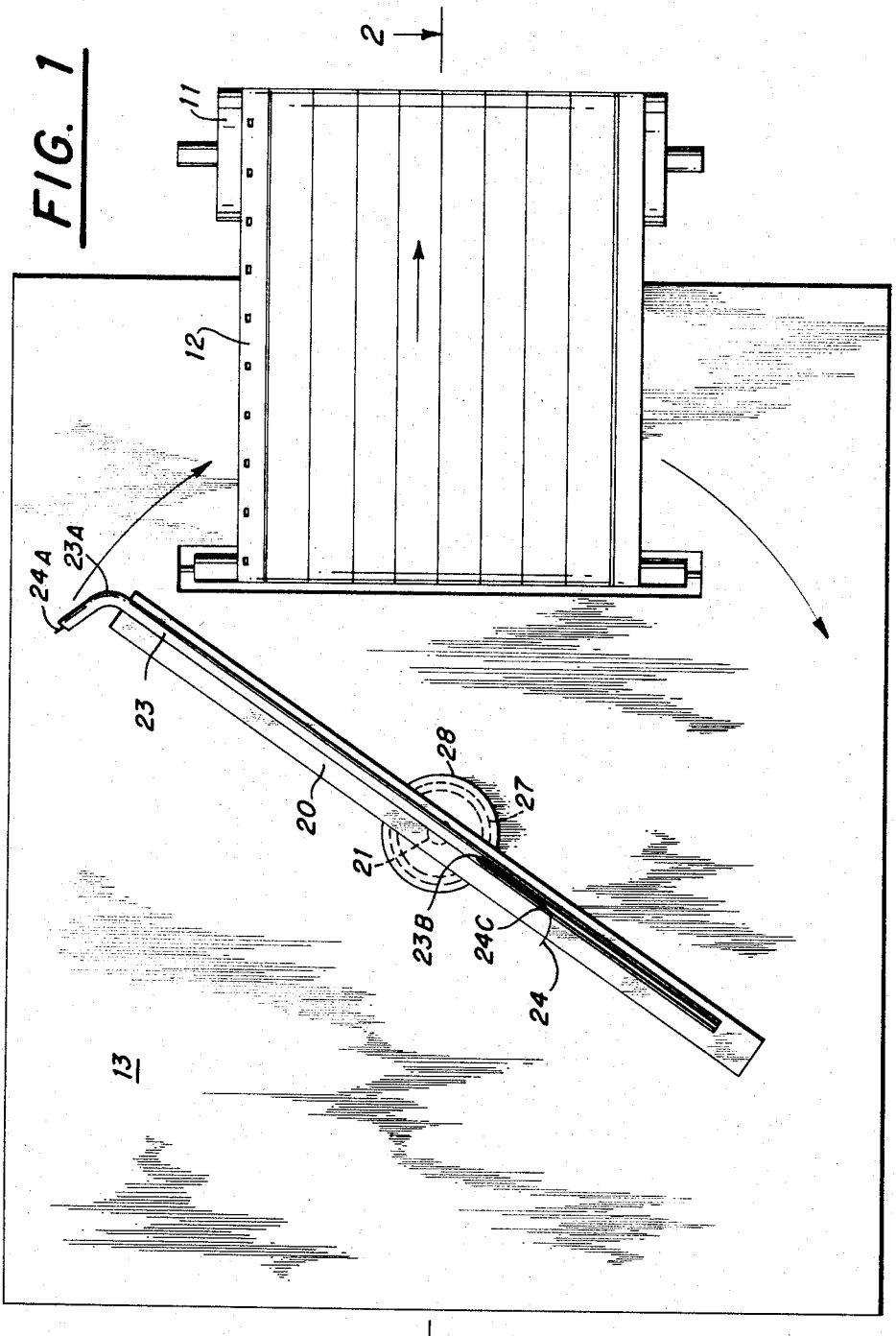
INVENTOR.
LEIGHTON L. MORSE
BY
ATTORNEYS June 27, 1967 L. L. MORSE 3,328,804
HIGH SPEED RECORDER WITH CENTRIFUGAL STYLUS FEED
Filed July 27, 1965 3 Sheets-Sheet 2
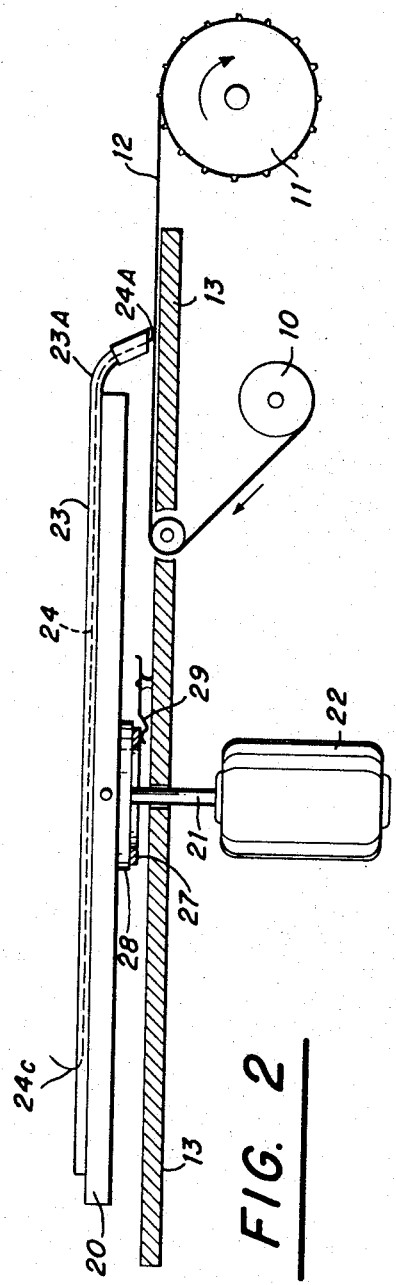
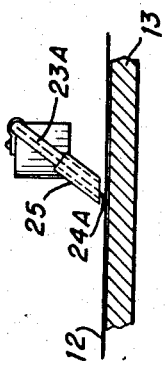
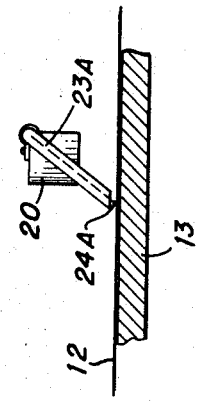
INVENTOR.
LEIGHTON L. MORSE June 27, 1967 L. L. MORSE 3,328,804
HIGH SPEED RECORDER WITH CENTRIFUGAL STYLUS FEED
Filed July 27, 1965 3 Sheets-Sheet 3

INVENTOR.
LEIGHTON L. MORSE
BY
ATTORNEYS

United States Patent Office 3,328,804
Patented June 27, 1967

3,328,804
HIGH SPEED RECORDER WITH CENTRIFUGAL
STYLUS FEED
Leighton L. Morse, 3931 La Cresta Drive,
San Diego, Calif. 92107
Filed July 27, 1965, Ser. No. 475,291
8 Claims. (Cl. 346—139)

The invention described herein may be manufactured and used by or for the Government of the United States of America for governmental purposes without the payment of any royalties thereon or therefor.

This invention relates to stylus structures for recorders of the type in which a metal stylus moves across and marks an electro-sensitive paper blank.

In spite of the considerable development work in recorders, there is not available at present a recorder suitable for certain uses. While facsimile recorders have reasonable resolving power, they generally lack the necessary stylus life for long recordings. In under-ice navigation, for example, it is necessary that the recording stylus accurately record minute changes of profile of the overhead ice and of the underlying bottom contour and must record continuously for hours or days without interruption. Ink-dispensing styli are not suitable, and metal needles for electrostatically marking sensitized paper must rub against the paper with optimum pressure. The needle wears and must be replaced periodically. Needle replacement and adjustment can have the disastrous effect of shifting the base line of the recording.

The object of this invention is to provide an improved stylus structure in which optimum pressure is applied to the recording paper for extended periods of time.

A more specific object of this invention is to provide a recording stylus in which the writing rate may be high and in which adjustment of the stylus is not necessary.

The objects of this invention are attained in a structure having a rotating arm driven by a synchronous motor at relatively high speed. Disposed radially along the arm is a guide channel or tube in which is disposed a length of recording wire. The mass of the recording wire in the tube is such that at the attained rotational speed of the arm, the centrifugal force imparted to the wire produces optimum pressure against the recording paper.

Other objects and features of this invention will become apparent to those skilled in the art by referring to the preferred embodiments described in the following specification and shown in the accompanying drawings in which:

FIGS. 1, 2 and 3 are plan, elevational and end views, respectively, of one embodiment of the stylus structure of this invention;

FIG. 4 shows a stylus needle stabilizer embodying this invention;

Figure 6:
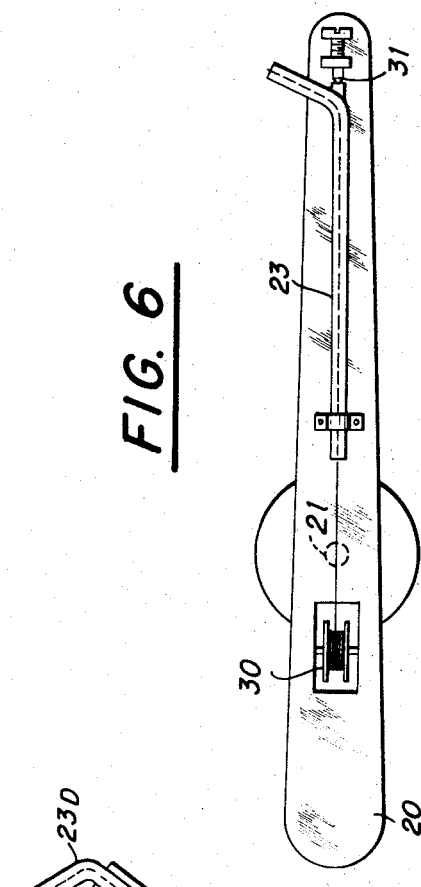
FIG. 6 shows a reel on a stylus arm for storing stylus wire, according to this invention.
Figure 7:
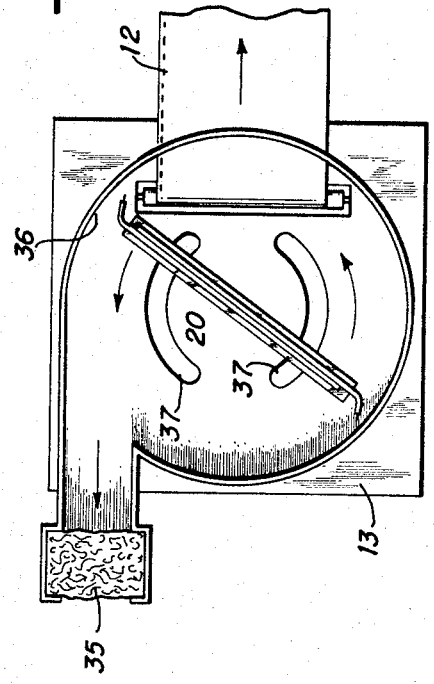
FIG. 7 shows a ventilating system for the structure of this invention.

Referring to FIGS. 1, 2 and 3, the recording paper 12 upon which signals are to be marked is electro-sensitive in the sense that visible and permanent marks are left on the paper under the tip of a recording metal needle or stylus having the requisite voltage. The necessary voltage gradient for "writing" is created between the tip of the needle 24A and the underlying metal platen or base plate 13. For best results the needle actually touches the paper and is dragged across the paper as recording proceeds. The paper is slowly transported from drum 10 to drum 11 by a clock motor, not shown. The stylus 24A, however, moves at high speed across the paper in an arcuate path on the end of arm 20. The rotating shaft 21 of driving motor 22 comprises the center of rotation of the stylus.

Arm 20 is keyed to the shaft 21 and is preferably well balanced to minimize vibration at high speed. It is contemplated that motor speeds of 1800 or 3600 r.p.m., or higher, be employed.

The writing tip 24A is the end of the wire 24, a measured length of which is disposed lengthwise of the arm 20. It is an important and characteristic feature of this invention that the mass of the radially extending portion of wire 24 is sufficient that the centrifugal force, at the operating speed of the arm, the mass moves with measurable force radially outward along the arm. All or a portion of the radially extending wire is held in a guide chute, trough or channel member 23. The channel member is a tube. The outer end of the guide tube 23 is bent laterally outward and downward, as shown at 23A, toward the paper so that the end of the wire comes to rest against the paper.

The diameter of the wire at the writing tip is not critical although, as expected, better writing definition can be obtained with the smaller tips. Also, the diameter of the body of the wire can be chosen within wide limits. Good results have been obtained with "music" wire of stainless steel .004 inch in diameter. If the wire is less than .004 inch it has little bending strength and sometimes has a tendency to be thrown out of the end of the tube at high rotating speeds. If the wire is more than .010 inch in diameter it becomes too stiff to move readily around the turn 23A of the guide tube.

The recording paper moving across the platten 13 is not perfectly flat and causes bouncing of the stylus at the higher speeds. The edge of the paper will catch the tip and cause the tip to bounce and skip areas near the edge of the strip. If the wire stiffness and the pressure of the tip 24A is increased it can tear the paper. According to another important feature of this invention bouncing and smooth recording is assured by the addition of a nonmetallic, yieldable plastic sleeve 25 over the end of the tube 23A, FIG. 4, to bear against the wire immediately above the writing tip. The plastic sleeve effectively dampens all bounce. As shown in FIG. 4 the lower end of the sleeve 25 may be tapered to conform with the angle of the surface of the recording paper.

Commercially obtainable copper tubing is suitable for the guide member 23. The size of the tubing is not particularly critical, the only requirements being that the inside diameter be large enough to prevent binding on the wire 24. The stiffness of the wire and the curvature of the tube at bend 23A determines primarily the drag that is placed upon the wire as the wire moves toward the writing point. Preferably, the tube 23 extends the full length of the arm 20, across the center of rotation. Some or all of the tube may be slotted, shown at 23B, FIG. 1. The inboard end of the wire 24 may be given a sharp bend as shown at 24C, to extend outward through the slot 23B. In loading it is simply a matter of threading the end of the wire into the end of the tube and pushing it forward until the tip 24A comes into contact with the recording paper. The bend 24B is a convenient finger-hold for the wire.

One specific slip-ring structure is shown in FIGS. 1 and 2. The slip-ring 27 is a conducting ring mounted upon a disk 28 which is keyed to shaft 21. The wiper contact 29 insulatingly supported upon the platten 13 rubs against the ring 27. If the electro-sensitive recording paper 12 is of the commercially obtainable type known as "TELEDELTOS" of the dry type, the recording voltage should be in the neighborhood of 100 to 200 volts. Within this voltage range the dry paper will produce visible signals with a 5 to 6 db intensity range. On the other hand if the t type of TELEDELTOS paper is employed a 20 db cording range is obtained with a voltage range of 10 100. Good results were obtained with paper six inches de and a radius of curvature of the scribing point 24A out 4.5 inches.

Figure 5:
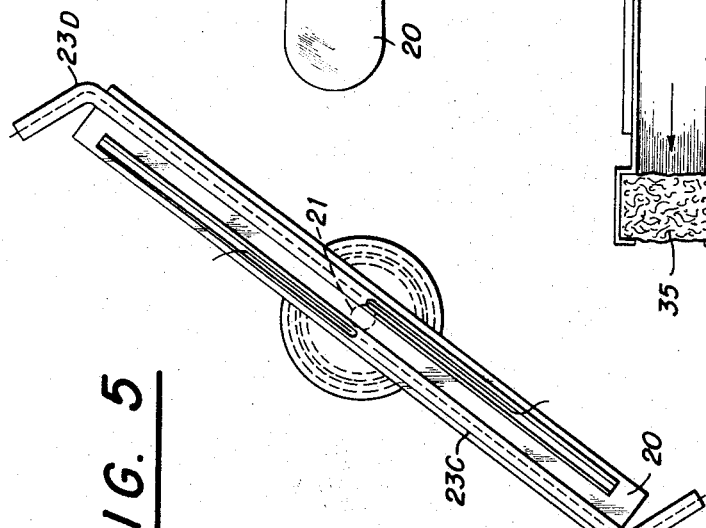
FIG. 5 is a plan view of a rotating arm with two styli.

Two or more recording styli may be driven by one mor. As shown in FIG. 5 the two guide tubes 23c and 23d e mounted side-by-side on one rotating arm. The recordg styli hence may be 180° apart and by simple timing echanism or split slip rings, two records may be plotted one recording sheet. It has been found that the wear the steel wire is at the rate of 1/8″ per hour. Hence, four ches of recording wire will operate without interruption r 32 hours. When replacement of the recording wire is cessary it is sufficient merely to insert a new length of re in the guide tube and then start the motor. Without justment of any kind the wire moves outward by cenifugal force and automatically applies the correct writg pressure against the paper.

In FIG. 6 it is proposed that an unlimited supply of cording wire be placed upon a small reel 30 mounted ar the center of rotation on the rotating arm 20. Thus the wire is worn away at the writing tip it feeds forard from the spool through the guide tube 23 to the riting tip. It is suggested in FIG. 6, further, that the angle approach of the writing stylus to the paper is readily ljustable by rotating the tube 23 within its supports. he threaded needle bearing 31 at the bend of the tube readily adjustable.

Long periods of high speed recording, it has been found, oduces troublesome quantities of dust and lint from the rface of the paper. Such dust and lint is trapped in the ter 35. The filter 35 is mounted in a tangential exhaust ort on the circular housing 36 concentric with the roting recording arm 20. Since the arm 20 is travelling at gh speeds considerable air pressure is created at the pephery of the circular housing. The resulting suction at e center draws air upward through the openings 37 in e platten 13. A shallow notch between the lower edge the circular housing 36 and the platten 13 permits gress of the recording paper 12 as it is drawn from one ool to the other, as shown in FIGS. 1 and 2.

A recorder constructed according to this invention has en operated for periods of eight hours without attenon even though the recording arm was rotating at a speed f 1800 revolutions per minute and the stylus was travelng at a linear speed of 850 inches per second. As the end f the stylus wire wore away, the wire automatically fed rward under centrifugal force to maintain optimum ressure on the recording paper. It was not necessary to op the recorder, or to hand-feed the stylus, or to make djustment.

Many modifications may be made in the details of the corder of this invention without departing from the ope of the invention as defined in the appended claims.

What is claimed is:

1. An electrical recorder having in combination a roting stylus structure and a flattened moving sheet sentive to the voltage of the tip of the stylus, said stylus ructure comprising:
   an elongated arm said arm being pivotally mounted intermediate the ends of the arm,
   a motor coupled to said arm for driving said arm at a predetermined rotary speed,
   said arm having a wire guide channel extending radially along said arm and curved at the outer end toward the recording areas on said sheet,
   wire stylus stock extending through said channel along said curved outer end, and into contact with said sheet, said wire stock being so disposed in said wire guide channel as to restrain lengthwise motion through said channel substantially only by the frictional drag between said wire and channel, said drag on said wire stock being slightly less than the centrifugal force on said wire stock so that the end of the wire stock rides on said sheet during said predetermined rotary arm speed.

2. The stylus structure defined in claim 1 further comprising a reel mounted on said arm near the motor pivot to supply wire to said channel as it is consumed during recording.

3. A rotating stylus structure comprising a motor driven arm:
   a tube extending radially along said arm,
   a recording wire disposed in said tube and adapted to be forced radially outward along said tube by centrifugal force at a predetermined rotary speed of said arm,
   the outer end of said tube being curved to place a predetermined drag on said wire, said drag being slightly less at said rotary speed than said centrifugal force.

4. In combination with the stylus structure defined in claim 3:
   a flat metal plate disposed in a plane parallel to the plane of rotation of said tube,
   said outer end of said tube being curved to a point closely adjacent said plate to bring the end of said wire into writing contact with recording paper on said plate, the contact pressure being a function of said centrifugal force.

5. In combination with the stylus structure defined in claim 4:
   a circular housing closely surrounding the circular path enscribed by the end of said recording wire, said housing having a tangential exhaust duct to exhaust air under pressure created by said rotating arm, and
   a dust filter in said duct.

6. A rotating stylus structure comprising:
   a motor-driven shaft,
   an arm crosswise with and keyed to said shaft,
   a guide tube disposed along said arm and terminated in a bend at one end near one end of said arm, and
   a stylus wire telescoped in said tube and adapted by centrifugal force at the operating speed of said motor, to move along said tube, around said bend, and out the end of said tube with measurable force.

7. The guide tube defined in claim 6 having a slot along the side of the tube, and
   the end of said stylus wire having a sharp bend to extend outwardly through said slot for loading purposes.

8. The stylus structure defined in claim 6 further comprising:
   a second guide tube disposed along said arm parallel to the first mentioned guide tube and terminating in a bend at the other end of said arm.

References Cited
UNITED STATES PATENTS
2,412,234   12/1946   Turner _____ 346—33
2,568,306   9/1951    Stamper _____ 346—139

FOREIGN PATENTS
495,265   11/1938   Great Britain.

RICHARD B. WILKINSON, *Primary Examiner.*

MICHAEL L. LORCH, *Assistant Examiner.*